(12) United States Patent
Holcomb et al.

(10) Patent No.: US 8,234,975 B2
(45) Date of Patent: Aug. 7, 2012

(54) HULLING DEVICE

(75) Inventors: David A. Holcomb, Seattle, WA (US); David Hull, Seattle, WA (US)

(73) Assignee: Chef'n Corporation, Seattle, WA (US)

( * ) Notice: Subject to any disclaimer, the term of this patent is extended or adjusted under 35 U.S.C. 154(b) by 402 days.

(21) Appl. No.: 12/582,633

(22) Filed: Oct. 20, 2009

(65) Prior Publication Data
US 2010/0236425 A1    Sep. 23, 2010

Related U.S. Application Data

(60) Provisional application No. 61/210,654, filed on Mar. 20, 2009.

(51) Int. Cl.
*A47J 23/00* (2006.01)
(52) U.S. Cl. ............... 99/546; 99/551; 99/635; 99/636; 99/637; 30/113.2; 30/113.1
(58) Field of Classification Search ............ 99/546, 99/544, 551, 635, 637, 636, 642; 30/113.2, 30/113.1, 113.3, 305
See application file for complete search history.

(56) References Cited

U.S. PATENT DOCUMENTS

| | | | | |
|---|---|---|---|---|
| 1,390,977 A * | 9/1921 | Behr | ............... | 30/113.1 |
| 1,500,085 A * | 7/1924 | Leavitt | ............... | 99/642 |
| 1,578,355 A * | 3/1926 | Olney | ............... | 99/642 |
| 1,774,355 A * | 8/1930 | Cory | ............... | 30/113.2 |
| 1,994,473 A * | 3/1935 | Jones | ............... | 99/546 |
| 2,028,239 A * | 1/1936 | Oths | ............... | 30/113.2 |
| 2,113,500 A * | 4/1938 | Stathem | ............... | 99/584 |
| 2,513,505 A * | 7/1950 | McKinnon | ............... | 30/113.2 |
| 3,520,341 A * | 7/1970 | Perrelli | ............... | 426/485 |
| 5,799,401 A * | 9/1998 | Gering | ............... | 30/300 |

* cited by examiner

*Primary Examiner* — Reginald L Alexander
(74) *Attorney, Agent, or Firm* — Seed IP Law Group PLLC

(57) ABSTRACT

A hulling device includes a cap, a pushing member, a spring between the cap and pushing member, and at least one nipper having two nipping members coupled to the pushing member and extending toward the cap. The nipping members are mutually shaped with the cap and slide contiguous respective contact regions of the cap to separate tips of the nipping members upon actuation of the pushing member. The separated tips can be inserted in a food item, such as a strawberry, and twisted and pulled to hull the food item. The user can release the pushing member when the tips are in the food item to improve gripping and severing the hull. The hulling device can also include a main body housing at least a portion of the pushing member, cap, spring, and first and second nippers, the main body being coupled to the cap, the pushing member, or both.

19 Claims, 7 Drawing Sheets

HULLING DEVICE

CROSS-REFERENCE TO RELATED APPLICATION

This application claims the benefit under 35 U.S.C. §119(e) of U.S. Provisional Patent Application No. 61/210,654 filed Mar. 20, 2009, incorporated herein by reference in its entirety.

BACKGROUND

1. Technical Field

The present disclosure is related to kitchen and/or food preparation tools, and more particularly, to a device for hulling a food item, such as a fruit.

2. Description of the Related Art

In the culinary arts, efficiency and presentation are both crucial to preparation of food items. One preparation task that is time-consuming is hulling food items. Various food items are hulled for different purposes, for example, to remove unwanted or uneatable portions, to provide an aesthetic appearance, or to achieve a shape that facilitates placing other items in the hulled region. One food category, which is frequently hulled, includes fruits, such as strawberries. Conventional methods of hulling include, in the simplest form, using a knife. However, such methods remove more than what is required. For example, in the case of strawberries, edible portions are removed along with the hull when a knife is used, resulting in wasting useful portions of the strawberry. Such elementary methods are also cumbersome and time-consuming, and pose a risk of injury to a user.

Other hulling devices or tongs are difficult to manipulate, making it hard to hull a large number of food items in a short amount of time and typically remove more of the food item than desired. Other existing devices that are more expedient to use include cylindrical coring portioners that remove a fixed volume of the food item regardless of the size of the food item, and therefore, result in wasting usable portions of the food item. These devices are also difficult to clean, as residue builds up inside the core-removing cylinder, which is not easily accessible.

BRIEF SUMMARY

According to one embodiment, a hulling device includes a pushing member configured to be selectively actuated, a cap spaced from the pushing member and including a plurality of contact regions, the pushing member being moveable with respect to the cap, a spring having a first end coupled to the pushing member and a second end coupled to the cap, and at least a first nipper. The first nipper includes a first base, a first nipping member and a second nipping member, the first base coupled to the pushing member, the first and second nipping members extending from the first base toward and beyond the cap, and respectively having a tip and a sliding region between the tip and the first base. The sliding regions of the first and second nipping members are slidably positioned adjacent respective contact regions of the cap, the sliding regions respectively mutually shaped with the contact regions to facilitate movement of the respective tips away from each other as the sliding regions slide against the contact regions upon actuation of the pushing member.

According to one aspect, the hulling device further includes a second nipper including a second base, a third nipping member and a fourth nipping member, the second base coupled to the pushing member, the third and fourth nipping members extending from the second base toward and beyond the cap, and respectively having a tip and a sliding region between the tip and the second base. The sliding regions of the third and fourth nipping members are slidably positioned adjacent respective contact regions of the cap, the sliding regions respectively mutually shaped with the contact regions to facilitate movement of the respective tips away from each other as the sliding regions slide against the contact regions upon actuation of the pushing member.

According to one aspect, the hulling device includes a main body including a first end, a second end, and an opening extending from the first end to the second end, the main body housing at least a portion of the pushing member, cap, spring, and/or first nipper, the opening facilitating access to the pushing member toward the first end, the tips of the at least first nipper projecting beyond the opening toward the second end during use.

According to one aspect, the first and second nipping members each include a protuberance positioned between the base of the respective first and second nipping members and the corresponding contact regions of the cap, to slide against the respective contact regions and move the tips away from each other upon actuation of the pushing member.

According to one aspect, a periphery of each of the first and second nipping members toward the respective tips converges toward the tip, forming a wedge, the wedge having a concavity.

In one aspect, the pushing member is slidably coupled to an inner surface of the main body.

According to one embodiment, a hulling device includes a longitudinal axis, a cap having a peripheral edge, a pushing member opposing, and moveably positioned with respect to, the cap along the longitudinal axis, and a spring having a first end coupled to the pushing member and a second end coupled to the cap. The hulling device further includes first and second nippers. The first nipper has a first base, a first nipping member and a second nipping member, the first base coupled to the pushing member, the first and second nipping members extending from the first base toward the cap, and respectively having a tip and a contoured region between the tip and the first base, the contoured regions slidably engaging respective peripheral regions of the cap, and having a non-planar profile to facilitate movement of the respective tips away from each other as the contoured regions slide against the peripheral regions. Similarly, the second nipper has a second base, a third nipping member and a fourth nipping member, the second base coupled to the pushing member, the third and fourth nipping members extending from the second base toward the cap, and respectively having a tip and a contoured region between the tip and the second base, the contoured regions slidably engaging respective peripheral regions of the cap, and having a non-planar profile to facilitate movement of the respective tips away from each other as the contoured regions slide against the peripheral regions.

The hulling device also has a main body housing at least a portion of the pushing member, cap, spring, and/or first and second nippers, the main body being coupled to the cap.

DETAILED DESCRIPTION

Figure 1:
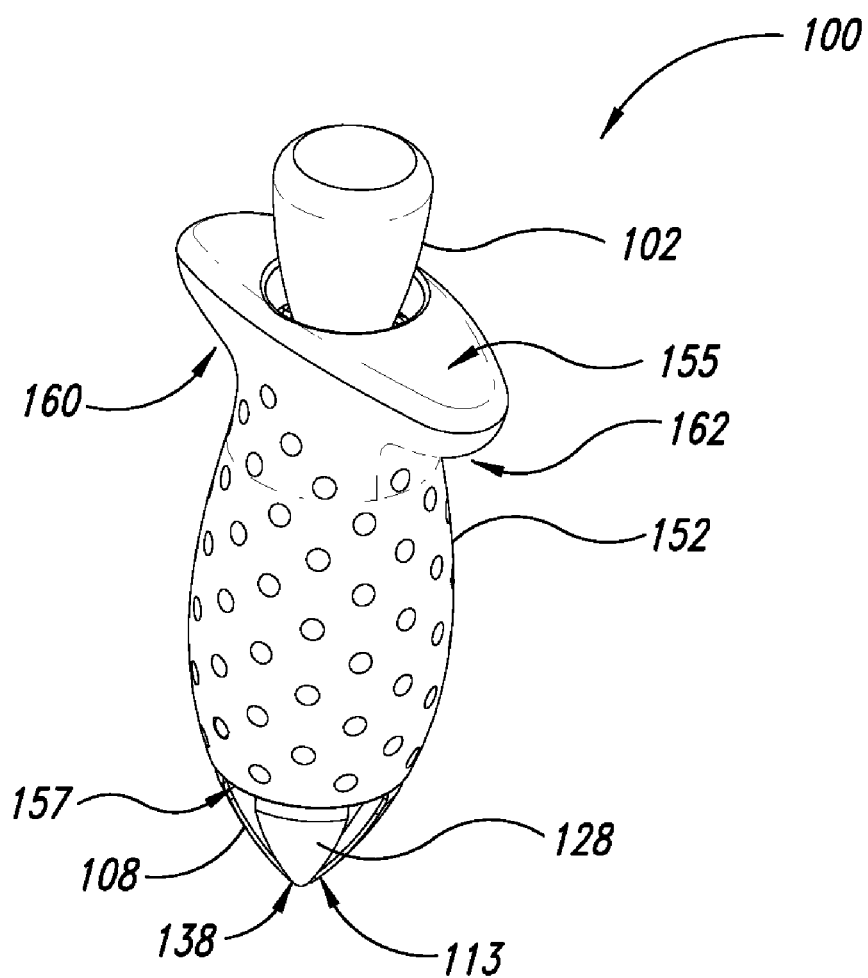
FIG. 1 is an isometric view of a hulling device according to one embodiment, shown in a closed state.
Figure 2:
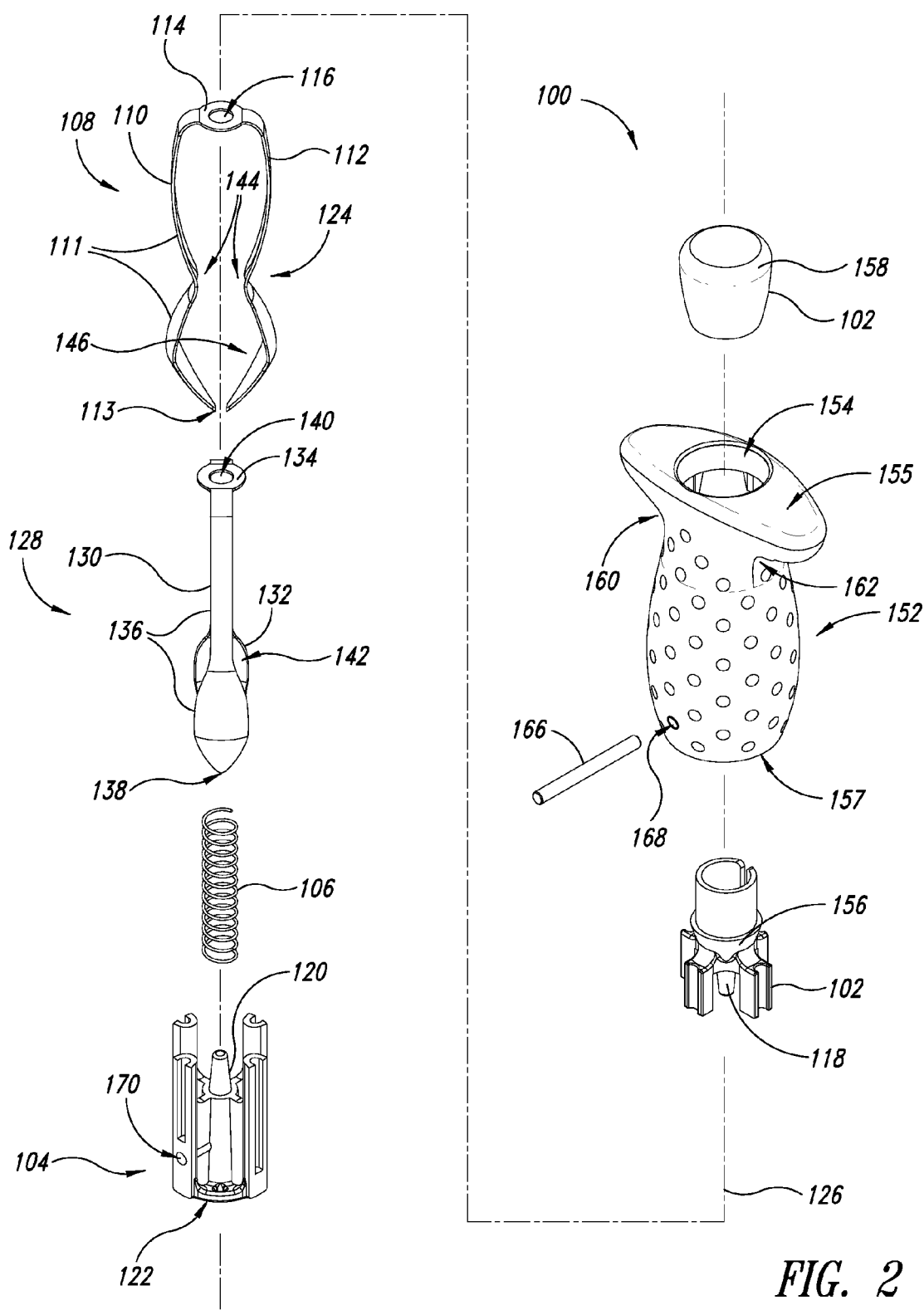
FIG. 2 is an exploded isometric view of the hulling device of FIG. 1 according to one embodiment.
Figure 3:
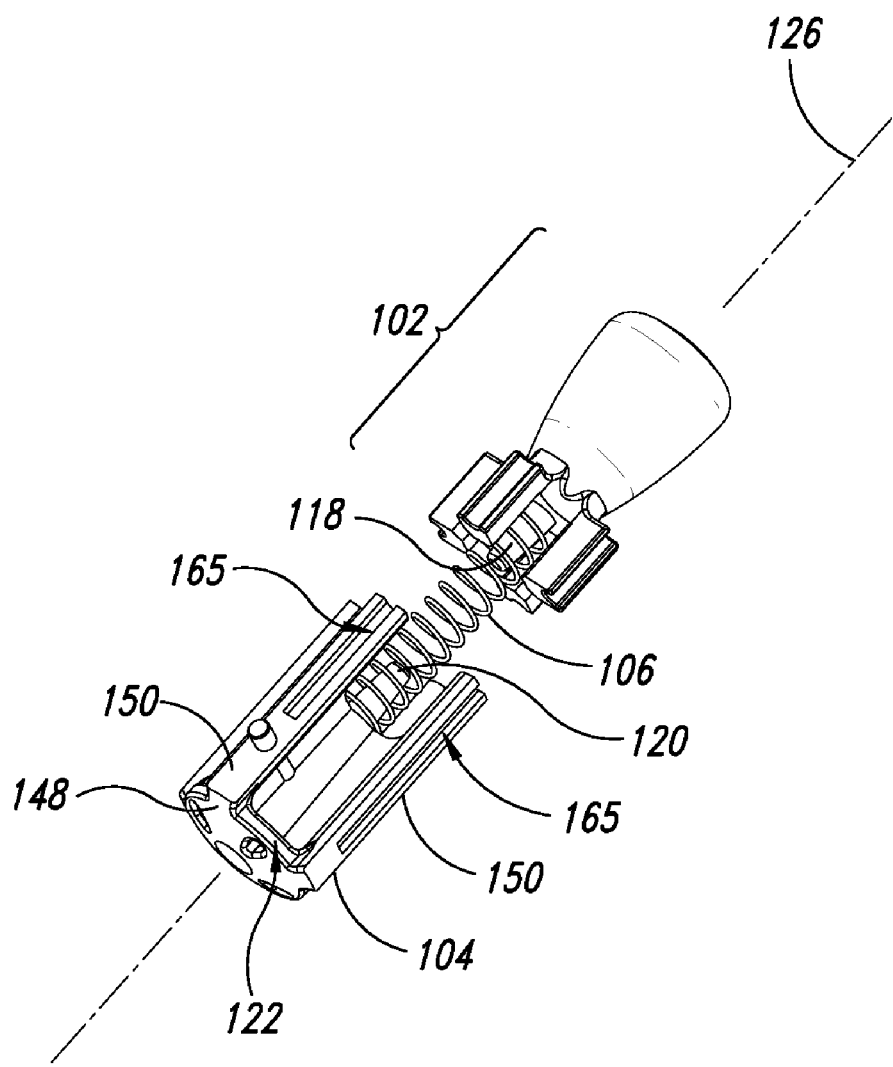
FIG. 3 is an isometric view of a portion of a hulling device illustrating a pushing member, spring, and cap, according to one embodiment.

FIG. 1 illustrates a hulling device 100 according to one embodiment including a pushing member 102, which allows a user to operate the hulling device, as discussed in detail below. As illustrated in FIG. 2, the pushing member 102 is shown disassembled into two parts. During operation, the two parts are assembled, as shown in FIG. 3. The hulling device 100 includes a cap 104 spaced from the pushing member 102, and a spring 106 having a first end configured to be coupled to or abutted against the pushing member and a second end configured to be coupled to or abutted against the cap, as shown in one aspect in FIG. 3. As illustrated in FIG. 2, the hulling device 100 further includes at least a first nipper 108 having a first nipping member 110, a second nipping member 112, and a base 114. The first and second nipping members 110, 112, each include a body 111 and a tip 113, the body being located between the tip and the base.

Figure 4:
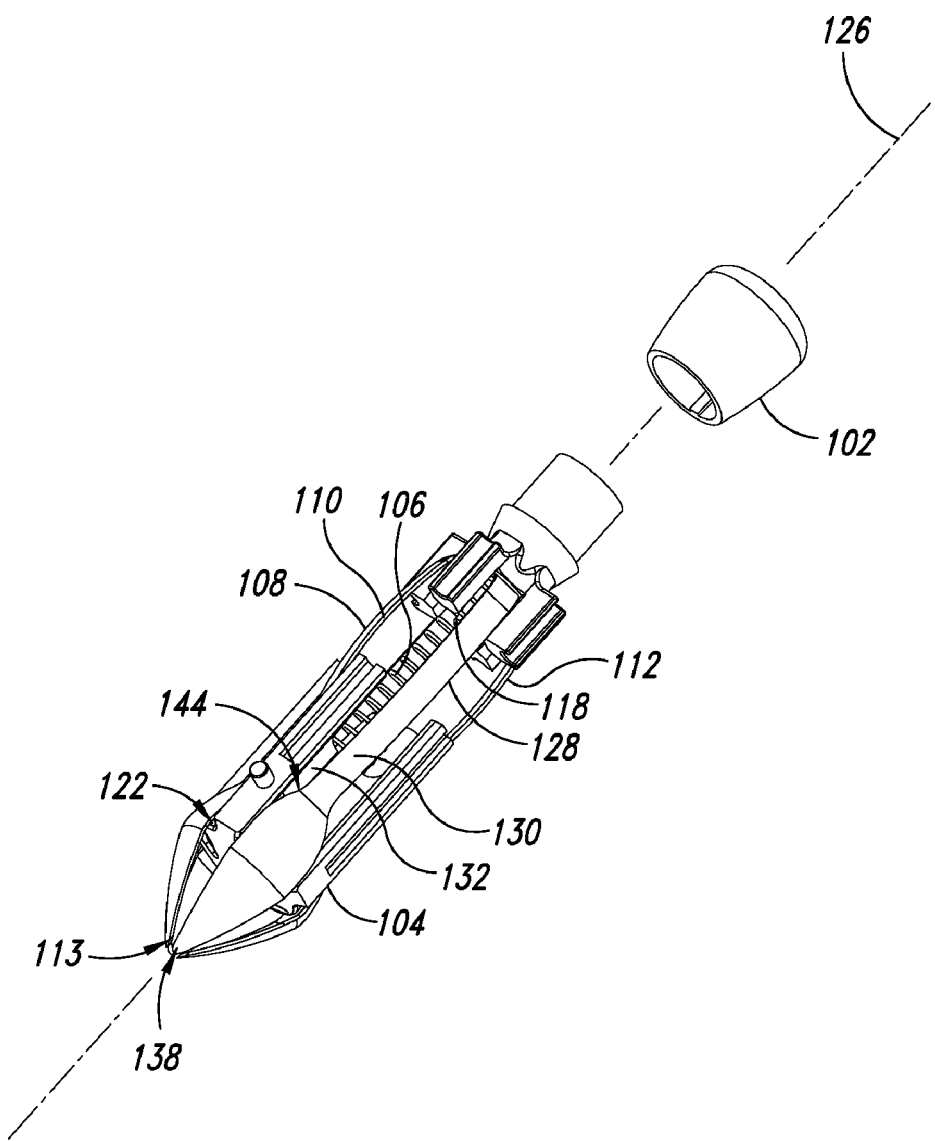
FIG. 4 is an isometric view of a portion of a hulling device illustrating a portion of a pushing member, spring, cap, and two nippers, according to one embodiment.

The base 114 is configured to be coupled to or abutted against the pushing member 102 to move as a unit therewith, and the pushing member is moveably coupled with respect to the cap 104. For example, as shown in FIG. 2, the base 114 may include an aperture 116, and the pushing member 102 may include a protrusion 118, the aperture receiving the protrusion until the base contacts a region of the pushing member adjacent the protrusion. As illustrated in FIGS. 2-4, the spring 106 can include a coil spring and the cap 104 may include a protrusion 120, the first and second ends of the spring 106 respectively circumscribing the protrusions 118, 120, and engaging the protrusions and/or engaging or positioned adjacent or contiguous respective regions or surfaces of the pushing member 102 and the cap located adjacent the protrusions. The spring 106 can retain the base 114 against the pushing member 102.

When a user exerts a force on the pushing member 102, the pushing member moves the first nipper 108. In one embodiment, a portion of the body 111 of each of the first and second nipping members 110, 112 bear against a portion of the cap 104. The respective bodies 111 of the first and second nipping members 110, 112, are mutually shaped with the cap 104, such that as the first and second nipping members 110, 112 slide against the cap 104, the tips 113 of the nipping members 110, 112 move away from each other.

In some embodiments, additional nippers can be included to improve the overall grip or cutting action of the hulling device 100 over the hull of the food item. For example, in one embodiment, the hulling device 100 includes a second nipper 128 having third and fourth nipping members 130, 132, and a base 134. The third and fourth nipping members 130, 132 each includes a body 136 and a tip 138, the body extending between the tip and the base 134. The second nipper 128 is coupled to the pushing member 102 toward the base 134, for example via an aperture 140 formed in the base being coupled to the protrusion 118 of the pushing member. The respective bodies 136 of the third and fourth nipping members 130, 132 are also mutually shaped with the cap 104 such that the tips 138 move away from each other when the nipping members 130, 132 respectively slide against the cap 104.

The following discussion is directed to one embodiment of the first and second nippers 108, 128, and cap 104, which facilitates the aforementioned movement of the tips 113, 138.

In one aspect, the cap 104 includes contact regions 122 and the first and second nipping members 110, 112, each include a sliding region 124 between the tip 113 thereof and the base 114 of the first nipper 108. Furthermore, the third and fourth nipping members 130, 132 each include a sliding region 142. A portion of each sliding region 124, 142 rests contiguous corresponding contact regions 122 of the cap 104 before the pushing member 102 is actuated. In the illustrated embodiment, there are four contact regions 122 separated by approximately 90° around the cap 104, and one of the nipping members 110, 112, 130, 132 rests against each of them. Before actuation of the pushing member 102, the tips 113, 138 are in a retracted or closed state, illustrated in FIG. 1. The sliding regions 124, 142 and corresponding contact regions 122 are mutually shaped such that when the pushing member 102 is actuated and moved toward the cap 104, the interaction between each contact region and the corresponding ones of the first, second, third, and fourth nipping members (collectively "nipping members") 110, 112, 130, 132, moves their respective tips 113, 138 away from each other to assume an open state, illustrated in FIG. 5.

When the tips 113, 138 are in the open state, the user can insert the tips 113, 138 into a food item to hull the food item or a portion thereof. For example, the user can insert the tips 113, 138 into a strawberry from the end thereof having a stem, such that the tips 113, 138 are embedded into the strawberry. The user can then twist and pull the hulling device 100, the tips severing and extracting the strawberry hull and stem. Upon inserting the tips 113, 138 into the strawberry or other food item, the user may also release the pushing member 102 to improve or strengthen the grip of the tips on the severed hull, as the tips tend to retract toward the closed state.

In one embodiment, the first and second nippers 108, 128 can be elongated along a longitudinal axis 126 of the hulling device 100 with the first nipping member 110 positioned diametrically opposed to the second nipping member 112, and the third nipping member 130 positioned diametrically opposed to the fourth nipping member 132.

In one aspect, as shown in FIG. 2, at least a portion of the respective sliding regions 124, 142 of the nipping members 110, 112, 130, 132 includes a protuberance 144 bulging toward the longitudinal axis 126 and being located between the corresponding tips 113, 138, and bases 114, 134.

For clarity of illustration and description, FIG. 4 illustrates only the first and second nippers 108, 128, the cap 104, the spring 106, and the pushing member 102. In one aspect, the respective contact regions 122 of the cap 104 include an outer periphery or circumferential region of the cap 104. The following discussion is directed to the movement of the first nipping member 110 during actuation of the pushing member 102, with respect to the corresponding contact region 122. The other nipping members 112, 130, 132, are moved in a similar manner.

As illustrated in FIG. 4, before actuation of the pushing member 102, the protuberance 144 of the first nipping member 110 is at least partially positioned between the contact region 122 of the cap 104 and the pushing member 102. As the pushing member 102 is pressed or pushed toward the cap 104, an inclined portion of the first nipping member located between the tip 113 and a crest of the protuberance 144 slides against the contact region 122. The tip 113 moves farther away from the longitudinal axis 126 as the first nipping member 110 slides with respect to the contact region 122, the tip being farthest from the longitudinal axis when the crest of the protuberance 144 reaches the contact region.

When the user releases the pushing member 102, or ceases application of force to the pushing member 102, the spring 106 biases the pushing member 102 away from the cap 104, the pushing member 102 and the first nipping member 110 returning to their respective positions before actuation of the pushing member 102.

In one embodiment, the portion of the nipping member 110 between the tip 113 and the protuberance 144 includes a concavity 146 (FIG. 2), and a periphery of the nipping member 110 in a region toward the tip 113, converges toward the tip 113, forming a concave wedge-shaped end for insertion in the food item.

Figure 5:
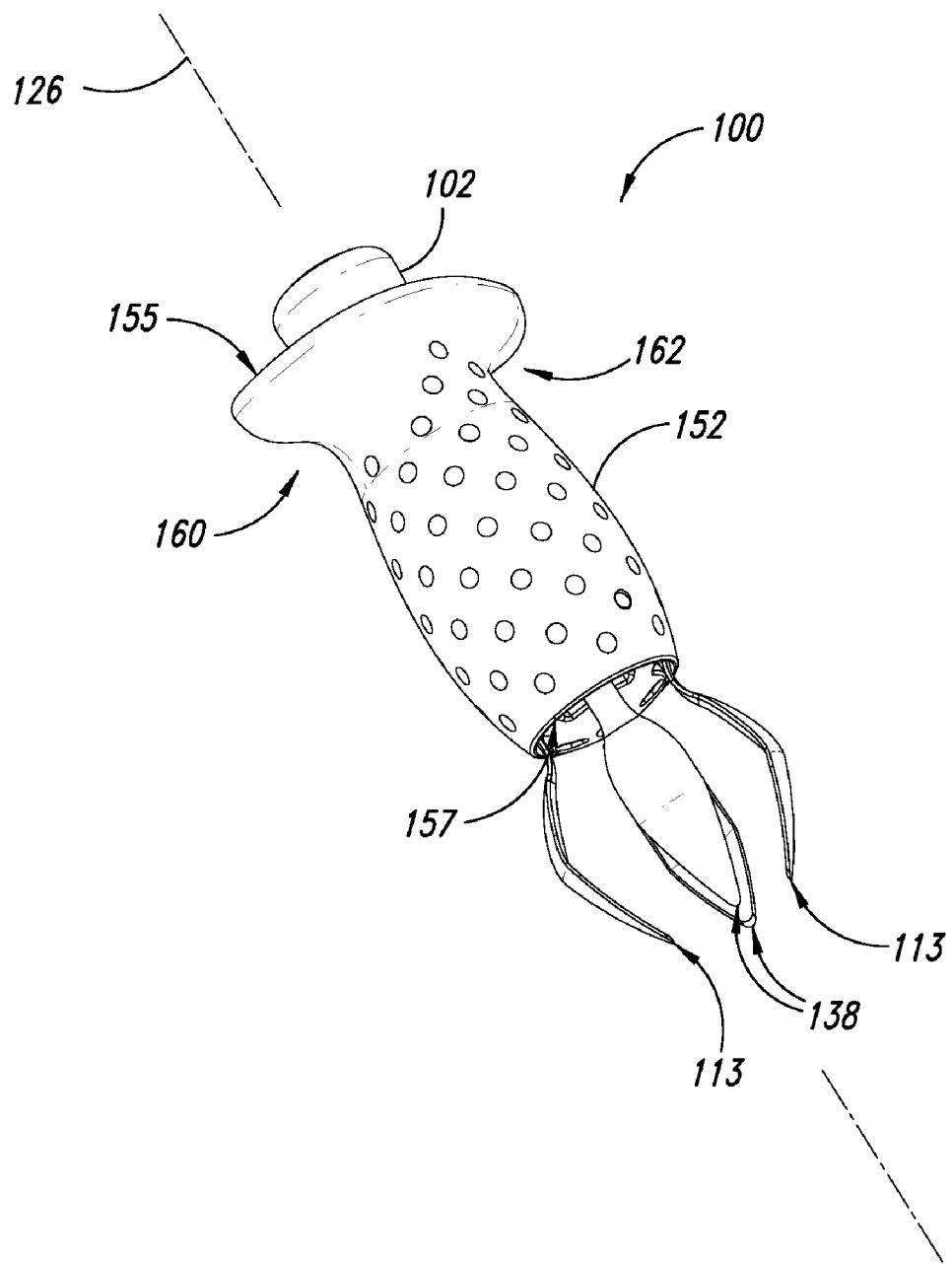
FIG. 5 is an isometric view of the hulling device of FIG. 1, shown in an open state.

In the illustrated embodiment of FIG. 4, the first nipping member 110 is positioned diametrically opposed to the second nipping member 112 about the longitudinal axis 126, and the third nipping member 130 is positioned diametrically opposed to the fourth nipping member 132 about the longitudinal axis 126. Furthermore, the first and second nippers 108, 128, can be radially offset by about 90 degrees such that the tips 113, 138 form a claw-like structure. As illustrated in FIG. 5, upon actuation of the pushing member 102, the tips 113, 138 move away from each other substantially in unison to facilitate insertion of the tips into the food item.

The concavity 146 and the converging end of the respective nipping members 110, 112, 130, 132, toward the respective tips 113, 138, facilitate easy insertion of the tips into the food item and substantially minimize removal of useful parts of the food item, such as the fruit portions of a strawberry around its hull. Furthermore, in embodiments where the first and second nippers 108, 128, are both incorporated, the hull is severed substantially about its entire periphery upon insertion of the tips 113, 138 into the food item, further facilitating complete, expedient, and efficient removal of hull without removing excess portions of the food item.

As stated above, the user may release the pushing member 102 after inserting the tips 113, 138 into the food item so that the tips tend to move toward the closed state to more securely grip the severed hull. After removal of the hull, the user can push the pushing member 102 to open the tips 113, 138, and easily dispose of substantially the entirety of the removed hull.

As illustrated in FIG. 3, the cap 104 may include a base 148 and a plurality of limbs 150 extending from the base toward the pushing member 102. The contact regions 122 can be formed by distinct portions of a periphery of the base 148 between the limbs 150. For example, the limbs 150 can extend from respective regions of the periphery of the base 148 located between the contact regions 122. The limbs 150 can also be configured to facilitate guiding the nipping members 110, 112, 130, 132 (FIG. 4) as they move during actuation of the pushing member 102, and/or to prevent unwanted lateral movement thereof.

As illustrated in FIGS. 1 and 2, in one embodiment, the hulling device 100 can also include a main body 152 housing at least a portion of the pushing member 102, the cap 104, the first and second nippers 108, 128, and the spring 106. In one embodiment, the main body 152 includes an opening 154 (FIG. 2) extending from a first end 155 to a second end 157 of the main body, about the longitudinal axis 126. The opening 154 provides access to the pushing member 102 toward the first end 155. Moreover, the tips 113, 138 of the nipping members 110, 112, 130, 132 extend through the opening 154 beyond the second end 157.

The pushing member 102 and the main body 152 can include structural features that assist in gripping and efficiently applying a force to the pushing member 102. For example, as illustrated in FIG. 2, the pushing member 102 can include a pusher 156 and a button 158 coupled to the pusher and adapted to conform to a finger tip of the user. Furthermore, the main body 152 can include, or be shaped to form, first and second recesses 160, 162, configured to conform to a grip of the user. The recesses 160, 162 permit a user to grip one or both of the first and second recesses with one or more fingers, and to press on the button 158 with his or her thumb to actuate the pushing member 102 and move the pusher 156 toward the cap 104.

The components of the hulling device 100 can be removably coupled to each other. For example, in one embodiment, the first and second nippers 108, 128 can be removably coupled to the pushing member 102 at their respective bases 114, 134. The spring 106 can be removably coupled at opposing ends thereof to the pushing member 102 and cap 104. Moreover, the button 158 can be removably coupled to the pusher 156. Furthermore, the main body 152 can be removably coupled to the cap 104. In embodiments in which the components are removably coupled, the hulling device 100 can be more easily and expediently assembled for use and disassembled for cleaning the hulling device 100 and/or replacing one or more of the components.

Figure 6:
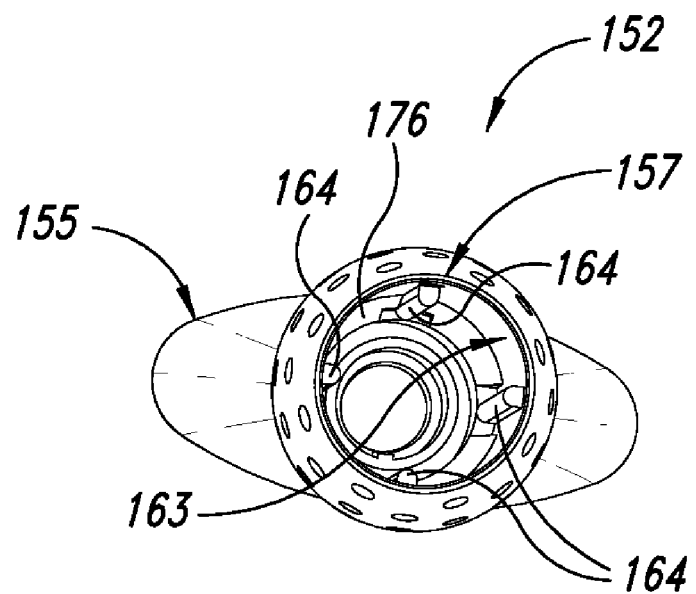
FIG. 6 is a perspective plan view of a main body of a hulling device according to one embodiment.

FIG. 6 is an isometric view of the main body 152, viewed from the second end 157 thereof, according to one embodiment. As illustrated in FIG. 6, the main body 152 can include a plurality of ribs 164 extending along a length of an inner surface 163 of the main body about the longitudinal axis 126 (FIG. 2). The ribs 164 can extend substantially parallel to, or in the general direction of, the longitudinal axis 126. Furthermore, in one embodiment, as illustrated in FIG. 3, the limbs 150 of the cap 104 can each include a recess 165 formed therein and configured to engage a respective one of the plurality of ribs 164 of the main body 152, fixedly coupling the main body to the cap.

As illustrated in FIG. 2, the hulling device 100 may include a pin 166, which can be used in addition to, or instead of, the ribs 164 and recesses 165 to couple the main body 152 to the cap 104. This configuration is more clearly shown in FIG. 7, in which only the pusher 156, main body 152, cap 104, and pin 166 are shown. The main body 152 includes one or more openings 168 extending therethrough. Furthermore, the cap 104 also includes one or more openings 170 extending through a portion thereof such that the openings in the cap are aligned with the openings 168 in the main body when the cap and the main body are assembled.

The cap 104 and the main body 152 can be preassembled such that the openings 168, 170 are aligned with each other, and the pin 166 is inserted through the openings, removably coupling the main body and the cap. In one embodiment, the openings 170 are through diametrically opposing limbs 150 of the cap 104, and the openings 168 are through diametrically opposing regions of a wall 171 of the main body 152. Only one opening of each respective pair of openings 168, 170 is within view in FIGS. 2 and 7. Furthermore, in one embodiment, the pin 166 extends laterally in a direction substantially perpendicular to the longitudinal axis 126.

Figure 7:
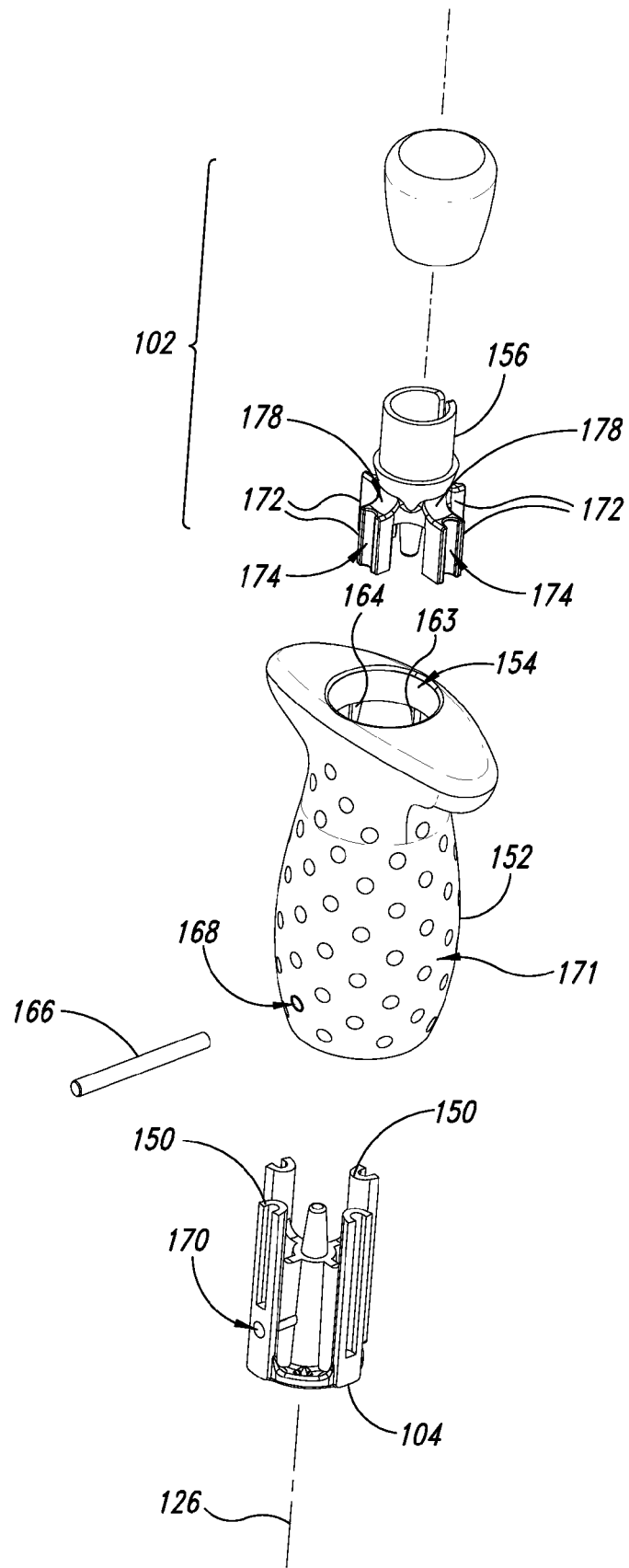
FIG. 7 is an exploded isometric view of a portion of a hulling device, illustrating a portion of a pushing member, main body, cap, and a coupling pin, according to one embodiment.

As discussed above, the pushing member 102 is moveably mounted. In one embodiment, as illustrated in FIG. 7, the pushing member 102 is configured to be slidably mounted with respect to the inner surface 163 of the main body 152.

For example, the pusher 156 of the pushing member 102 can include a plurality of limbs 172 extending toward the cap 104. The limbs 172 include respective recesses 174, configured to be slidably coupled to the ribs 164 on the inner surface 163 of the main body 152. In one aspect, a cross-sectional area of each of the recesses 174 is complementary to and larger than the cross-sectional area of the corresponding rib 164, to permit the pushing member 102 to slide with respect to the main body 152, while guiding the movement of the pushing member and/or preventing unwanted lateral or rotational movement of the pusher 156 in the main body 152.

Slidable engagement of the ribs 164 and recesses 174, resists rotation of the pushing member 102 and prevents rotation of the nippers 108, 128, with respect to the main body 152. Therefore, when the tips 113, 138 are in a food item, the main body 152 can be twisted to, in turn, twist pushing member 102 and the first and second nippers 108, 128 therewith to completely sever and remove the hull.

In one aspect, the main body 152 can include an internal region toward the first end 155, which is shaped or includes a member to prevent the pusher 156 from escaping through the opening 154 at the first end 155. For example, as illustrated in FIG. 6, the main body 152 can include a wall 176, and as illustrated in FIG. 7, the pushing member 102 can include a flared region 178 configured to engage the wall upon return of the pushing member after having been actuated and released.

The nipping members 110, 112, 130, 132 can be fabricated from a resilient material or be shaped to facilitate elastic deformation thereof. For example, the nipping members 110, 112, 130, 132 can be fabricated from a thin metal that elastically deforms as the protuberances 144 slide against the contact regions 122 of the cap 104 to move the tips 113, 138 to the open state.

As demonstrated above, a hulling device according to the present disclosure provides a tool for efficiently and expediently hulling a food item, such as various fruits. The hulling device is easily operated by the user pushing on a pushing member to move tips of nipping members to an open state in which the tips can be inserted into the food item. The user then twists and pulls the hulling device to remove the hull of the food item. The user may cease application of force to the pushing member while the tips are in the food item, to allow the tips to move toward each other for a better grip on the hull of the food item, before or during twisting and removal of the hull. The user can then press the pushing member to open the tips and dispose of the removed hull.

The various embodiments described above can be combined to provide further embodiments. All of the U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A hulling device comprising:
a pushing member configured to be selectively actuated;
a cap spaced from the pushing member and including a plurality of contact regions, the pushing member being moveable with respect to the cap;
a spring having a first portion coupled to the pushing member and a second portion coupled to the cap, the spring being configured to urge the pushing member apart from the cap; and
at least a first nipper including a first base, a first nipping member and a second nipping member, the first base coupled to the pushing member, the first and second nipping members extending from the first base toward the cap, and respectively having a tip and a sliding region between the tip and the first base, the sliding regions of the first and second nipping members slidably positioned adjacent respective contact regions of the cap, the sliding regions respectively mutually shaped with the contact regions to cause movement of the respective tips away from each other as the sliding regions slide against the contact regions upon actuation of the pushing member.

2. The hulling device of claim 1, further comprising:
a second nipper including a second base, a third nipping member and a fourth nipping member, the second base coupled to the pushing member, the third and fourth nipping members extending from the second base toward the cap, and respectively having a tip and a sliding region between the tip and the second base, the sliding regions of the third and fourth nipping members slidably positioned adjacent respective contact regions of the cap, the sliding regions respectively mutually shaped with the contact regions to cause movement of the respective tips away from each other as the sliding regions slide against the contact regions upon actuation of the pushing member.

3. The hulling device of claim 1, further comprising:
a main body including a first end, a second end, and an opening extending from the first end to the second end, the main body housing at least a portion of the pushing member, cap, spring, and first nipper, the opening facilitating access to the pushing member toward the first end, the tips of the at least first nipper extending through the opening toward the second end.

4. The hulling device of claim 3 wherein the main body is fixedly coupled with respect to the cap.

5. The hulling device of claim 4, further comprising:
a pin, the main body and cap respectively having apertures, the apertures of the main body being substantially aligned with the apertures of the cap, the pin extending through the aligned apertures to removably couple the main body to the cap.

6. The hulling device of claim 3 wherein the main body includes opposing first and second recesses toward the first end, the first and second recesses adapted to conform to a grip of a user to assist in actuation of the pushing member.

7. The hulling device of claim 3 wherein the pushing member is slidably coupled to the main body.

8. The hulling device of claim 7 wherein the main body includes a plurality of ribs and the pushing member includes a plurality of recesses respectively slidably engaging respective ones of the plurality of ribs.

9. The hulling device of claim 3 wherein the main body includes a plurality of ribs and the cap includes a plurality of limbs between respective contact regions, the limbs each having a recess engaging a respective one of the plurality of the ribs.

10. The hulling device of claim 1 wherein the pushing member includes a button and a pusher, the button coupled to the pusher and adapted to conform to a fingertip of a user to assist in actuation of the pushing member.

11. The hulling device of claim 1 wherein the first and second contact regions include respective outer peripheral regions of the cap.

12. The hulling device of claim 1 wherein movement of the tips away from each other is facilitated by elastic deformation of the first and second nipping members.

13. The hulling device of claim 1 wherein the first and second nipping members each include a protuberance positioned between the first and second bases of the respective first and second nipping members and the corresponding contact regions of the cap, adapted to slide against the respective contact regions and move the tips away from each other upon actuation of the pushing member.

14. The hulling device of claim 1 wherein a periphery of each of the first and second nipping members toward the respective tips, converges toward the tip, forming a wedge, the wedge having a concavity.

15. A hulling device comprising:
a main body having a longitudinal axis;
a cap;
a pushing member opposing, and moveably positioned with respect to, the cap along the longitudinal axis;
a spring having a first end coupled to the pushing member and a second end coupled to the cap; and
a first nipper including a first base, a first nipping member and a second nipping member, the first base coupled to the pushing member, the first and second nipping members extending from the first base toward the cap, and respectively having a tip and a contoured region between the tip and the first base, the contoured regions slidably engaging respective peripheral regions of the cap, and having a non-planar profile to facilitate movement of the respective tips away from each other as the contoured regions slide against the peripheral regions;
a second nipper including a second base, a third nipping member and a fourth nipping member, the second base coupled to the pushing member, the third and fourth nipping members extending from the second base toward the cap, and respectively having a tip and a contoured region between the tip and the second base, the contoured regions slidably engaging respective peripheral regions of the cap, and having a non-planar profile to facilitate movement of the respective tips away from each other as the contoured regions slide against the peripheral regions; and
a main body housing at least a portion of the pushing member, cap, spring, and first and second nippers, the main body being coupled to the cap.

16. The hulling device of claim 15 wherein the main body includes an inner surface having a plurality of ribs, each having a first end and a second end, the cap including a first plurality of limbs extending toward the pushing member, each of the first plurality of limbs including a first recess engaging a respective one of the plurality of ribs toward the first end thereof.

17. The hulling device of claim 15 wherein the pushing member includes a second plurality of limbs extending toward the cap, each of the second plurality of limbs including a second recess slidably engaging a respective one of the ribs toward the second end thereof, slidable engagement of the respective ribs and second recesses facilitating rotation of the pushing member with the main body.

18. The hulling device of claim 15 wherein the first, second, third, and fourth nipping members are positioned between respective ones of the first and second plurality of limbs, and the second plurality of limbs extend from a peripheral region of the cap between the respective contact regions.

19. A hulling device comprising:
a body adapted to be held between at least two fingers, the body having an opening therethrough;
a spring;
a pushing member projecting from the opening in the body in a first direction, the pushing member being coupled to the body and the spring such that, when the pushing member is moved towards the opening, the spring urges the pushing member back towards its initial position; and
a plurality of nipping members coupled to the pushing member to move as a unit therewith, a portion of each of the nipping members projecting out of the body in a second direction opposite the first direction, the nipping members being positioned to slide along respective ones of a number of contact regions of the body, and at least one of the nipping members and the contact regions being shaped to cause a distal portion the nipping members diverge as the pushing member is moved towards the opening in the body.

* * * * *